(No Model.)

D. H. BEACH.
HAND CAR.

No. 317,437. Patented May 5, 1885.

WITNESSES:
J. Cook.
Chas. Lurcott

INVENTOR:
David H. Beach
BY
ATTORNEYS.

UNITED STATES PATENT OFFICE.

DAVID H. BEACH, OF LITCHFIELD, CONNECTICUT.

HAND-CAR.

SPECIFICATION forming part of Letters Patent No. 317,437, dated May 5, 1885.

Application filed September 10, 1884. (No model.)

*To all whom it may concern:*

Be it known that I, DAVID H. BEACH, of Litchfield, in the county of Litchfield and State of Connecticut, have invented certain new and useful Improvements in Hand-Cars for Railroads, of which the following is a full, clear, and exact description.

This invention has for its object the production of a portable hand-car for railroads, for use by railroad superintendents or officials, tourists, and others, in which lightness shall be combined with adequate strength and a high rate of speed be readily attainable.

To these and other ends the invention consists in the construction and arrangement of parts, as will be hereinafter described and claimed.

Reference is to be had to the accompanying drawings, forming part of this specification, in which similar letters of reference indicate corresponding parts in both the figures.

Figure 1:
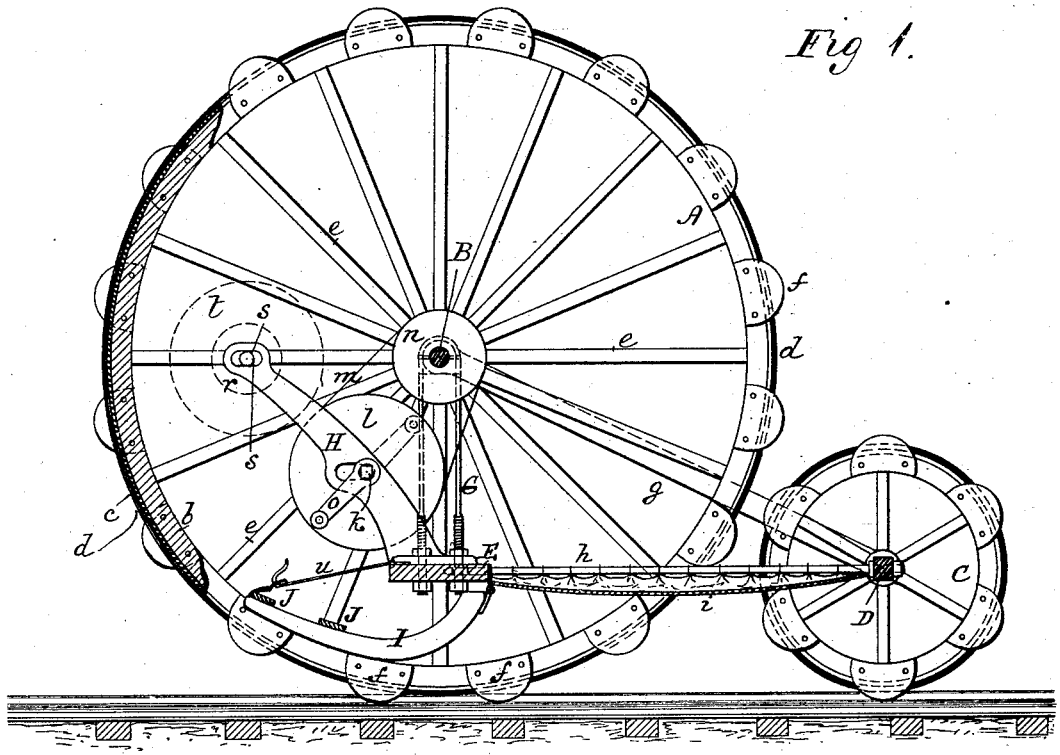
Figure 2:
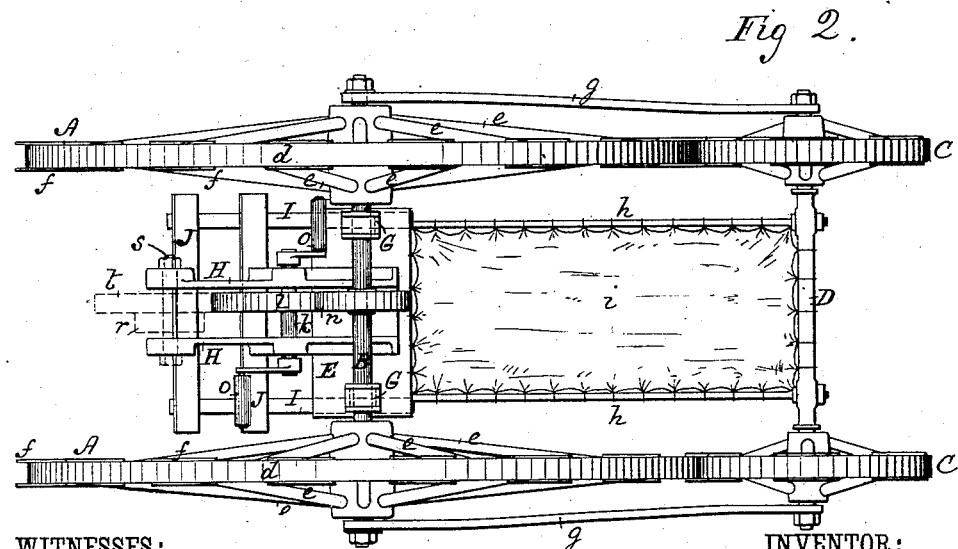

Figure 1 represents a vertical longitudinal section of a railroad hand-car embodying my invention, with one of the drive-wheels in partial section; and Fig. 2, a plan view of the vehicle.

A A indicate the two driving-wheels, fast on the ends of an axle, B, and arranged at a suitable distance apart to run on the rails of a line of railroad. These wheels, which occupy a front position, are of as large a diameter as it is practicable or convenient to have them, in order that a high rate of speed may be obtained. They should also be made as light as possible consistent with strength, and to this end they are, or may be, made each with a wooden felly, $b$, covered with a steel tire, $c$, that may in its turn be covered with a rubber band, $d$, to lessen noise, and the spokes $e$ be arranged inclining from reverse ends of the hub in opposite directions, and crossing near the felly, with which they connect on reverse sides of the wheel to that from which they started at the hub. Furthermore, said wheels, instead of being provided with continuous flanges to keep them on the rails, have separated flange-sections $f$, secured to them, and arranged at suitable distances apart to secure two of said flange-sections being always in working position with rails. This construction also serves to materially reduce weight of the wheels.

The rear and smaller wheels, C, of the vehicle may also be similarly constructed with flange-sections if desired. These wheels turn loosely on their axle D, which is connected by outside rods or connections, $g$, with the front axle, B, and by reaches or poles $h$ with the seat E, on which the operator or operators sit to propel the vehicle. A canvas or other covering, $i$, is laid across these reaches $h$, to hold traveling materials of any kind, or to form an extended seat, as desired.

The seat E is carried by suspension-straps G G, which form bearings for the axle B, and is adjustable from below by screw-threads and nuts to raise or lower it to suit different operators. Said suspended seat E also carries the mechanism by which the driving-wheels A A are rotated. Thus, attached to the seat E are standards H, supporting a shaft, $k$, having a pulley, $l$, from which a driving-belt, $m$, runs to a smaller pulley, $n$, fast on the axle B. Cranks or handles $o\ o$ are fitted on the ends of the shaft $k$, for the operators on the seat to rotate said shaft, and so to operate the driving-wheels A A. Where a still higher running velocity is required, a belt may be run from the pulley $l$ (by sliding said pulley on its shaft) to a smaller pulley, $r$, on a second shaft, $s$, carried by the brackets H, and which in its turn carries a larger pulley, $t$, that may connect direct by belt with the pulley $n$ on the axle B, or any other suitable speeding-up mechanism may be used.

To keep the driving band or bands at a proper stretch when raising or lowering the seat E, the standards H may be adjustable backward or forward on the seat, or the standard shaft or shafts may be in like adjustable slotted connection with the standards.

Hinged to the under side of the back of the seat E are foot-rest ribs I, capable of being raised or lowered, as required, by straps $u$, connecting their forward ends with the seat-irons, said ribs, which project out in front of and below the seat, serving to carry a foot-rest or boards, J, on or against which the feet of the operator or operators are planted while turning the crank-handles $o\ o$ to propel the vehicle.

By the construction and combinations of parts as described I am enabled to produce a light hand-car which can be readily lifted onto and off a railroad-track, it having no heavy frame-work, and a very high rate of speed may be obtained for it with comparatively slight manual exertion.

Having thus fully described my invention, I claim as new and desire to secure by Letters Patent—

1. In a hand-car for railroads, the combination of the drive-wheels A A and their fast axle B, the loose rear wheels, C C, and their axle D, the connections $g\ g$, the suspension-straps G, the attached suspension-seat E, and the hand driving mechanism connected with said seat, and one or more belts or bands for communicating motion to the axle of the driving-wheels, essentially as shown and described.

2. The adjustable hinged foot-rest I J $u$, in combination with the suspension-seat E, the suspension-straps G, the axle B, and the drive-wheels A A of the hand-car, substantially as specified.

3. The poles or reaches $h\ h$ and their connecting-covering $i$, in combination with the axle D of the wheels C C and the suspension seat E of the hand-car, essentially as described.

DAVID H. BEACH.

Witnesses:
EDWARD M. CLARK,
EDGAR TATE.